(12) United States Patent
Fujihara et al.

(10) Patent No.: US 9,021,196 B2
(45) Date of Patent: Apr. 28, 2015

(54) METHOD, SYSTEM AND COMPUTER PROGRAM PRODUCT FOR WRITING MULTIPLE FILES SIMULTANEOUSLY TO A TAPE MEDIA

(71) Applicant: International Business Machines Corporation, Armonk, NY (US)

(72) Inventors: Shinobu Fujihara, Tokyo (JP); Yutaka Oishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/786,324

(22) Filed: Mar. 5, 2013

(65) Prior Publication Data

US 2013/0246701 A1 Sep. 19, 2013

(30) Foreign Application Priority Data

Mar. 15, 2012 (JP) ................. 2012-058202

(51) Int. Cl.
G06F 3/00 (2006.01)
G06F 3/06 (2006.01)
H04N 7/18 (2006.01)

(52) U.S. Cl.
CPC ............. *G06F 3/0682* (2013.01); *G06F 3/061* (2013.01); *G06F 3/0643* (2013.01); *H04N 7/18* (2013.01)

(58) Field of Classification Search
CPC .... G06F 3/0601; G06F 3/0686; G06F 3/0605
See application file for complete search history.

(56) References Cited

U.S. PATENT DOCUMENTS 6,744,581 B2 * 6/2004 Miyamura ...................... 360/53
8,139,311 B2 * 3/2012 Oishi ......................... 360/77.12

* cited by examiner

*Primary Examiner* — Matthew Bradley
*Assistant Examiner* — Craig Goldschmidt
(74) *Attorney, Agent, or Firm* — Zilka-Kotab, PC

(57) ABSTRACT

In one embodiment, a method includes storing data received from at least two data sources in a buffer, writing the data from the at least two data sources to regions in a first wrap of a tape on a data-source basis in a first predetermined order, the regions in the first wrap being previously allocated to the at least two data sources, moving a head to a second wrap of the tape when an end of the first wrap of the tape is reached, and writing the data from the at least two data sources to regions in the second wrap in a second predetermined order, the second predetermined order being a reverse order relative to the first predetermined order, the regions in the second wrap being previously allocated to the at least two data sources. The first and second wraps have first and second predetermined lengths, respectively.

20 Claims, 6 Drawing Sheets

METHOD, SYSTEM AND COMPUTER PROGRAM PRODUCT FOR WRITING MULTIPLE FILES SIMULTANEOUSLY TO A TAPE MEDIA

RELATED APPLICATIONS

This application claims priority to Japanese Patent Application No. 2012/058202, filed Mar. 15, 2012, which is herein incorporated by reference.

BACKGROUND

The present invention relates to data storage systems, and more particularly, this invention relates to a method, system and computer program product for writing data to a tape media.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

There are occasions where one wants to store moving pictures taken with a plurality of data sources, for example surveillance cameras, to a single tape medium inserted in a single tape drive. In such a case, a data transfer rate of about one twentieth the maximum transfer rate of the tape medium is generally sufficient in writing data to the tape medium per camera. However, it is often desired to read data from the tape medium as fast as possible.

When pieces of data captured with N cameras are concurrently written to a tape medium, the transfer rate during a read operation is 1/N the maximum transfer rate of the tape medium. This transfer rate results because a moving picture file on the tape medium is fragmented as illustrated in FIG. 1, and when moving picture 1, for example, is read, moving picture fragments (2-X) to (4-X) need to be skipped in order to read all of moving picture fragments (1-X).

One conventional solution is to re-write moving picture data written on a tape medium to the same tape medium or to a different tape medium so that each file is recorded in contiguous locations as illustrated in FIG. 2. This may increase the transfer rate at which a portion of moving picture data is read from the tape medium on demand to the maximum transfer rate of the tape medium. To accomplish this, however, another tape drive and another tape medium for re-writing the data are required. If data is re-written to the same tape medium, the available space on the tape medium decreases by half. Accordingly, recording the same amount of picture data needs a tape medium that has a storage capacity twice as large as required when data is not re-written. Moreover, re-writing data requires extra time and steps.

In another approach, data may be temporarily stored in a buffer and, once data from all cameras has been stored, the data may be written file by file. However, to do so requires a considerably large buffer area and is often not realistic in terms of cost-effectiveness.

BRIEF SUMMARY

According to one embodiment, a method for writing data onto a tape includes storing data received from at least two data sources in a buffer, and writing the data from the at least two data sources to regions in a first wrap of a tape on a data-source basis in a first predetermined order, the first wrap having a first predetermined length, and the regions in the first wrap being previously allocated to the at least two data sources. The method also includes moving a head to a second wrap of the tape when an end of the first wrap of the tape is reached, and writing the data from the at least two data sources to regions in the second wrap in a second predetermined order, the second predetermined order being a reverse order relative to the first predetermined order, the second wrap having a second predetermined length, and the regions in the second wrap being previously allocated to the at least two data sources.

According to another embodiment, a computer program product for writing data onto a tape includes a computer readable storage medium having program code embodied therewith, the program code readable/executable by a controller to: store data received from at least two data sources in a buffer and write the data from the at least two data sources to regions in a first wrap of a tape on a data-source basis in a first predetermined order, the first wrap having a first predetermined length, and the regions in the first wrap being previously allocated to the at least two data sources. The program code is also readable/executable by a controller to move a head to a second wrap of the tape when an end of the first wrap of the tape is reached, and write the data from the at least two data sources to regions in the second wrap in a second predetermined order, the second predetermined ordered being a reverse order relative to the first predetermined order, the second wrap having a second predetermined length, and the regions in the second wrap being previously allocated to the at least two data sources.

According to yet another embodiment, a data storage system includes a controller, a buffer adapted to store data received from at least two data sources, a magnetic head electrically coupled to the controller, and a drive mechanism for passing a magnetic medium over the magnetic head, where the controller is configured to: store data received from at least two data sources in a buffer and write the data from the at least two data sources to regions in a first wrap of a tape on a data-source basis in a first predetermined order, the first wrap having a first predetermined length, and the regions in the first wrap being previously allocated to the at least two data sources. The controller is also configured to move the head to a second wrap of the tape when an end of the first wrap of the tape is reached, and write the data from the at least two data sources to regions in the second wrap in a second predetermined order, the second predetermined ordered being a reverse order relative to the first predetermined order, the second wrap having a second predetermined length, and the regions in the second wrap being previously allocated to the at least two data sources.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
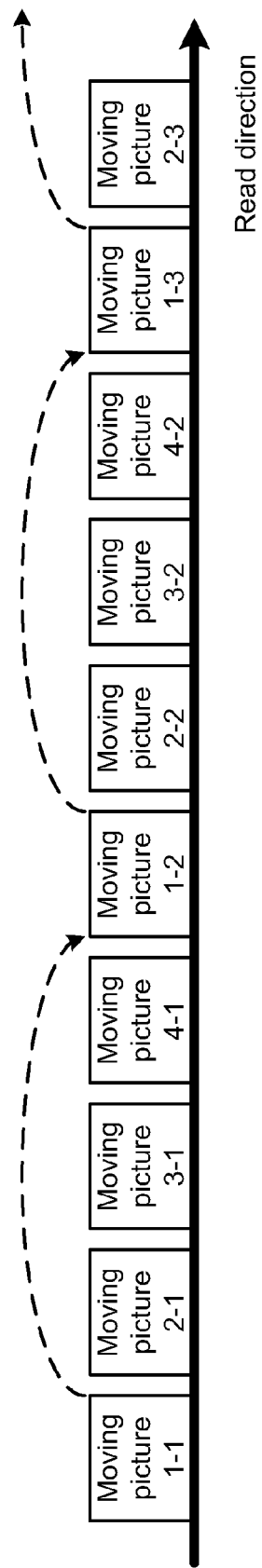
FIG. 1 is a schematic diagram of a conventional method for writing and reading data to and from a tape according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof.

In one general embodiment, a method for writing data onto a tape includes storing data received from at least two data sources in a buffer, writing the data from the at least two data sources to regions in a first wrap of a tape on a data-source basis in a first predetermined order, the first wrap having a first predetermined length, and the regions in the first wrap being previously allocated to the at least two data sources. The method also includes moving a head to a second wrap of the tape when an end of the first wrap of the tape is reached, and writing the data from the at least two data sources to regions in the second wrap in a second predetermined order, the second predetermined order being a reverse order relative to the first predetermined order, the second wrap having a second predetermined length, and the regions in the second wrap being previously allocated to the at least two data sources.

In another general embodiment, a computer program product for writing data onto a tape includes a computer readable storage medium having program code embodied therewith, the program code readable/executable by a controller to store data received from at least two data sources in a buffer and write the data from the at least two data sources to regions in a first wrap of a tape on a data-source basis in a first predetermined order, the first wrap having a first predetermined length, and the regions in the first wrap being previously allocated to the at least two data sources. The program code is also readable/executable by a controller to move a head to a second wrap of the tape when an end of the first wrap of the tape is reached, and write the data from the at least two data sources to regions in the second wrap in a second predetermined order, the second predetermined ordered being a reverse order relative to the first predetermined order, the second wrap having a second predetermined length, and the regions in the second wrap being previously allocated to the at least two data sources.

In yet another general embodiment, a data storage system includes a controller, a buffer adapted to store data received from at least two data sources, a magnetic head electrically coupled to the controller, and a drive mechanism for passing a magnetic medium over the magnetic head, where the controller is configured to: store data received from at least two data sources in a buffer and write the data from the at least two data sources to regions in a first wrap of a tape on a data-source basis in a first predetermined order, the first wrap having a first predetermined length, and the regions in the first wrap being previously allocated to the at least two data sources. The controller is also configured to move the head to a second wrap of the tape when an end of the first wrap of the tape is reached, and write the data from the at least two data sources to regions in the second wrap in a second predetermined order, the second predetermined ordered being a reverse order relative to the first predetermined order, the second wrap having a second predetermined length, and the regions in the second wrap being previously allocated to the at least two data sources.

Various preferred embodiments of the present invention improve the data reading speed of a tape drive in reading data from a tape, more specifically, the data transfer rate in data reading. Additional embodiments improve the data transfer rate in data reading by providing a novel method for a tape drive to write data to a tape in a case where data is continuously transmitted from a plurality of data sources to the tape drive.

For example, according to one approach, a method for writing data to a tape in a tape drive that records data while the tape is running back and forth in a longitudinal direction of the tape is provided. The method includes storing data received from at least two data sources in a buffer; writing data received from at least two data sources stored in the buffer to regions in a first wrap having a first predetermined length on a data-source-by-data-source basis in a predetermined order; and moving a head to a second wrap of the tape when an end of the first wrap of the tape is reached and writing the data from the data sources to regions in the second wrap having a second predetermined length on a data-source-by-data-source basis in the reverse order to the predetermined order in the first wrap while the tape is running in the direction opposite to the direction in writing to the first wrap.

In numerous approaches, the data transfer rate during a data read may be increased as a result of faster access to contiguous data in adjacent wraps for each data source, because data from each data source may be written to regions in a wrap of the tape, which have been/are allocated to each data source, in a predetermined order in a running direction of the tape. In other words, data from each data source is placed in regions in a wrap in the same transverse regions (locations) on the tape in each wrap.

In other approaches, if the amount of data to be written from the data sources is smaller than the amount of data that can be written to the regions in the wrap, the step of writing to the first wrap and the step of writing to the second wrap may include writing predetermined dummy data following the data to the end of the regions.

In yet other approaches, access to contiguous data in adjacent wraps for each data source may be quickened because data from each data source may be written in the same transverse regions (locations) on the tape in each wrap even when the amount of data to be written is smaller than the data amount that can be written in a particular region in a wrap.

In additional approaches, a predetermined length of a wrap (e.g. the first and/or second wraps) may be determined on the basis of a storage capacity, Vr, obtained according to the following equation:

$$Vr=Vb*N/(N+1)$$

where Vr is the storage capacity of the respective wrap having the predetermined length, Vb is the storage capacity of the buffer, and N is the number of the data sources.

In some approaches, when the number of data sources increases, data may be sequentially stored in the buffer while adjusting the predetermined length of wraps.

In further approaches, the method may further include moving the head to a third wrap of the tape when an end of the second wrap of the tape is reached and writing data from the data sources to regions in the third wrap in the same order as the predetermined order in the first wrap. Writing to third wrap occurs while the tape is running in the same direction as the direction when writing to the first wrap. In addition, the third wrap may have a third predetermined length, and the regions in the third wrap may have been previously allocated to the data sources.

According to one approach, a large amount of data from different data sources may be quickly and continuously read by reversing the running direction of the tape every time the head is moved from one wrap having a predetermined length to another wrap.

According to another approach, the predetermined order for writing data from each data source may be determined according to a transfer rate of data sent from the data sources.

According to yet another approach, where there are at least two data sources, overflow of the buffer may be prevented, e.g. the proper amount of data may be maintained in the buffer, by writing first the data from a data source that first sends its data.

According to some approaches, the regions in the wrap may be determined according to the amount of data sent from each of the data sources.

According to various other approaches, the amount of data read from each wrap may be flexibly changed on a data-source-by-data-source basis, for example, by enlarging the particular regions in a wrap if the amount of data is large, and reducing the particular regions in a wrap if the amount of data is small.

In one approach, the predetermined length of the first wrap, the second wrap or the third wrap may be determined according to the storage capacity, Vb, of the buffer.

Figure 3:
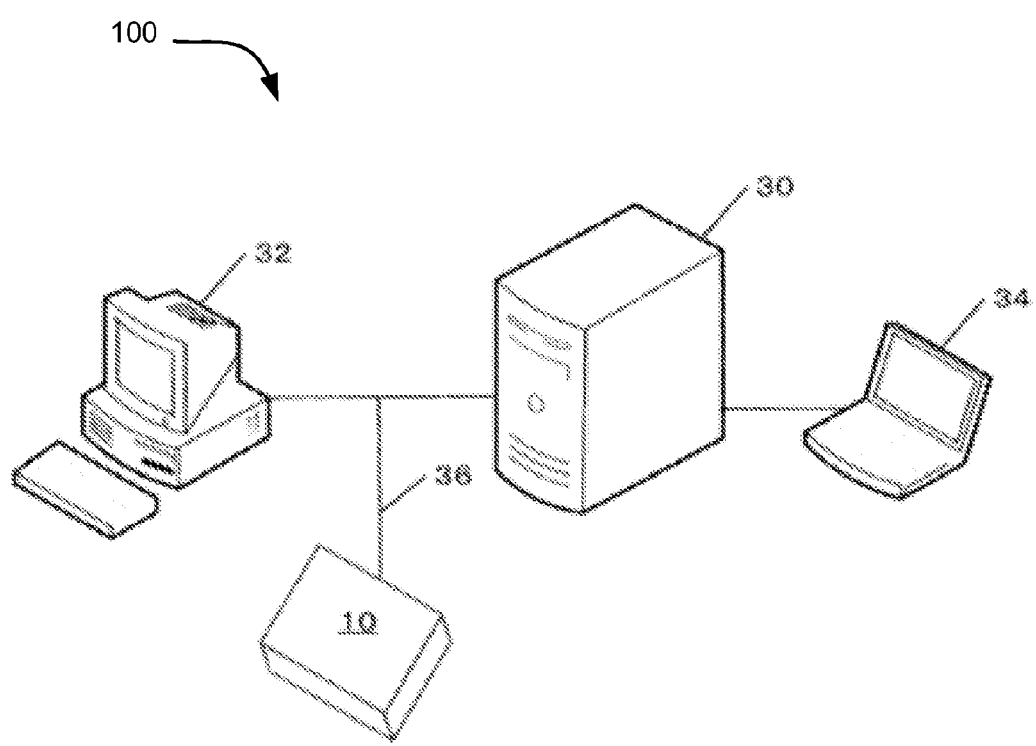
FIG. 3 is a schematic diagram of an exemplary configuration of a file system according to one embodiment.

Referring now to FIG. 3, a schematic diagram of an exemplary file system 100 is shown according to one embodiment. The file system 100 includes a tape drive 10, a host (e.g. a server) 30, and user devices 32 and 34, which are capable of communicating with one another through a network 36. Such user devices may include, but are not limited to personal computers (PCs), terminals, desktop computers, handheld computers, etc. or any other type of logic. FIG. 3 depicts only one tape drive 10 and one host (server) 30 for illustrative purposes only. Accordingly, the file system 100 may include two or more tape drives 10 and hosts (servers) 30. While also not depicted, a plurality of data sources, e.g. recorders such as cameras, may be connected to the network 36 and capable of transmitting data to the tape drive 10 directly or through the server 30 and the user devices 32, 34.

In one approach, the file system 100 may be a Linear Tape File system (LTFS). LTFS is a mechanism that enables direct access to a file stored in a tape cartridge when the tape cartridge is inserted into the tape drive, including but not limited to a hard disk drive (HDD), USB memory, other removable recording medium such as a CD-R, etc. In order to build a file system on a tape drive, the tape drive may need to have a partition feature. In the LTO-5 specifications, which are the latest LTO specifications, a tape is divided into two partitions.

Figure 4:
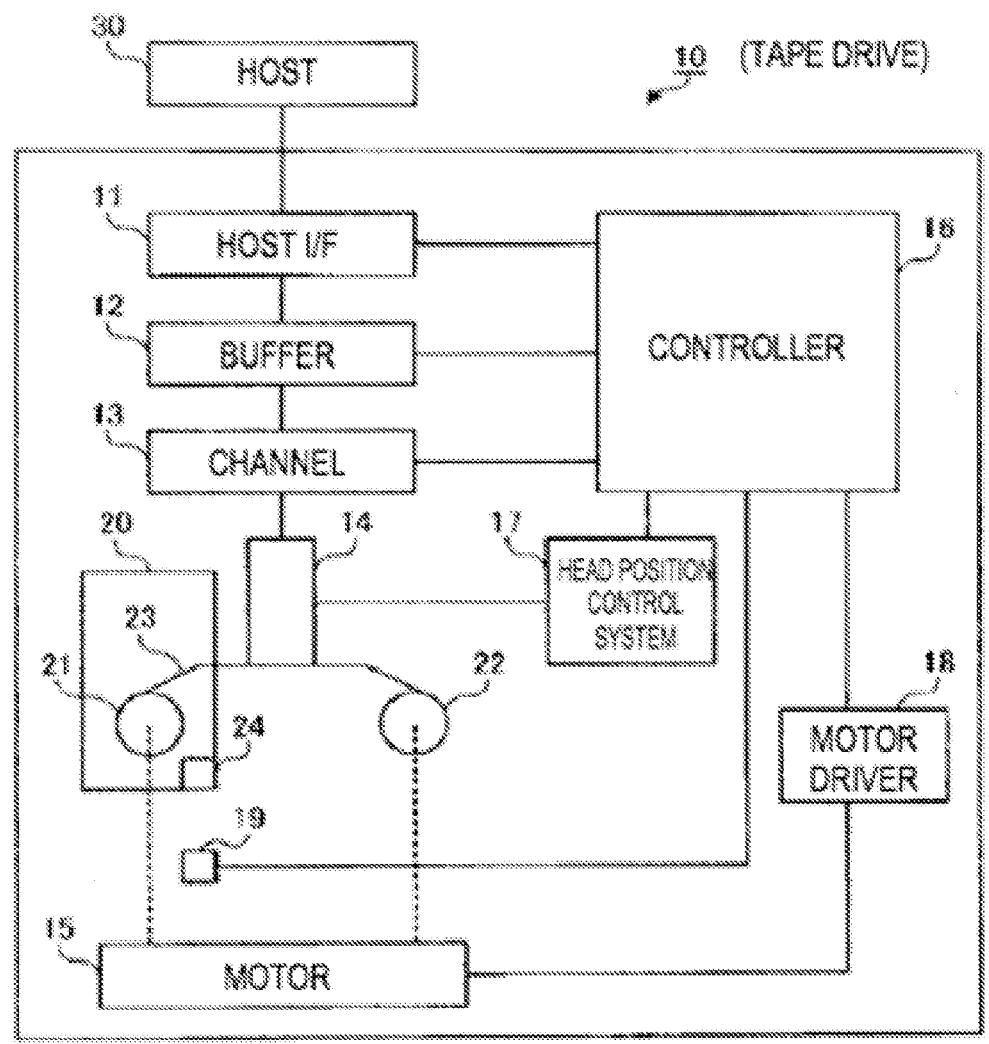
FIG. 4 is a schematic diagram of tape drive according to one embodiment.

Now referring to FIG. 4, a schematic diagram of an exemplary configuration of a tape drive 10 is shown according to one embodiment. The tape drive 10 includes a host interface (hereinafter referred to as the "host I/F") 11, a buffer 12, a channel 13, a head 14 and a motor 15. The tape drive 10 also includes a controller 16, a head position control system 17 and a motor driver 18. The tape drive 10 is designed to allow a tape cartridge 20 to be loaded when the tape cartridge 20 is inserted in the tape drive 10. Accordingly, the tape cartridge 20 is also depicted here. The tape cartridge 20 includes a tape 23 wound on reels 21, 22. As the reels 21, 22 rotate, the tape 23 moves in the longitudinal directions from the reel 21 to the reel 22 (the forward direction) or in the longitudinal direction from the reel 22 to the reel 21 (the backward direction). In some approaches, tape 23 may be magnetic tape or other suitable tape medium as understood by one having skill in the art upon reading the present disclosure.

The tape cartridge 20 also includes a cartridge memory (CM) 24. The CM 24 records information about how data was written on the tape 23, for example. In some approaches, the data may be accessed at high speed by using an RF interface to consult indices of the data written on the tape 23, the usage of the tape 23, and the like, without contacting the tape 23. The interface used in accessing the CM 24, such as the RF interface, is represented as a cartridge memory interface (hereinafter referred to as "CM I/F") 19 in FIG. 4.

The host I/F 11 communicates with a host (server) 30, the user device 32, and other apparatuses. For example, the host I/F 11 may receive from the OS of the host 30, a command to write data to the tape 23, a command to move the tape 23 to a target position, and a command to read data from the tape 23. With the use of LTFS described above, data in the tape drive may be directly referred to from the OS in a desktop computer, and a data file may be executed by a double-click or copied by drag-and-drop, as in the case of handling a file in a hard disk.

With continued reference to FIG. 4, the buffer 12 may be a memory that stores data written on the tape 23 and data read from the tape 23. For example, the buffer 12 may be a dynamic random access memory (DRAM). The buffer 12 may include a plurality of buffer segments, each of which stores a dataset, which may be read and written on the tape 23 as a unit. Data sent from data sources, including but not limited to a plurality of recorders such as cameras, through the network 36 (shown in FIG. 3) may be sequentially stored in the buffer 12.

The channel 13 may be a communication path for use in transmitting data to be written on the tape 23 to the read-write (R/W) head 14 and in receiving data read from the tape 23 from the R/W head 14. Although FIG. 4 depicts only one R/W head 14, in some embodiments there may be two or more R/W heads 14. Details of the R/W head 14 are described below.

Figure 2:
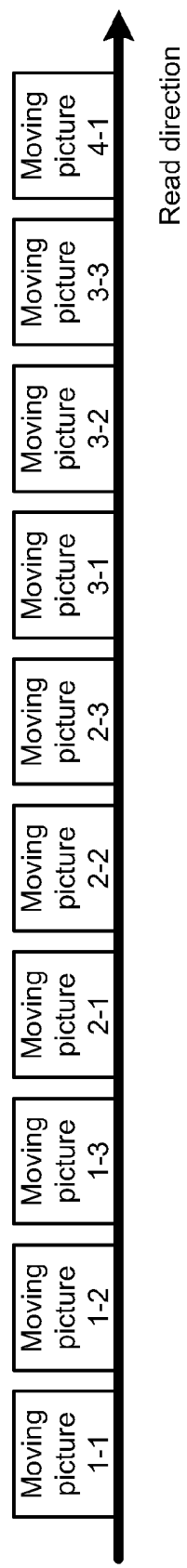
FIG. 2 is a schematic diagram of conventional method for writing and reading data to and from a tape according to the prior art.

The head 14 writes information to the tape 23 and reads information from the tape 23 while the tape 23 moves back and forth in a longitudinal direction. The motor 15 rotates the reels 21 and 22. The motor 15 is depicted as a single rectangle in FIG. 2; however, in preferred embodiments, two motors 15, one for each of the reels 21 and 22, may be provided.

Still referring to FIG. 4, the controller 16 may be or include a processor and/or any logic for exercising control over the tape drive 10 and any subsystem of the tape drive 10. For example, the controller 16 may control writing data on the tape 23 and reading data from the tape 23 in accordance with a command received by the host I/F 11. The controller 16 may also controls the head position control system 17 and the motor driver 18. The controller 16 may operate under logic known in the art, as well as any logic disclosed herein. The controller 16 may be coupled to the buffer 12 or a memory of any known type, which may store instructions executable by the controller 16. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The head position control system 17 may keep track of a desired wrap. The term wrap as used herein refers to a plurality of tracks on the tape 23 that may be read or written at the same time by the head 14. The number of wraps may vary depending on the format of the tape 23. In some approaches, the tape 23 has several tens of wraps. The length of a wrap (predetermined length) may be set with the controller 16. When it becomes necessary to a switch (move) from one wrap to another, the head 14 may also need to be electrically switched. Such a switch may be controlled by the head position control system 17.

As also shown in FIG. 4, the motor driver 18 drives the motor 15. As previously described, if two motors 15 are provided, two motor drives 18 are also provided. The CM I/F 19 may be implemented by an RF reader/writer, for example, and may write and read information to and from the CM 24.

Figure 5:
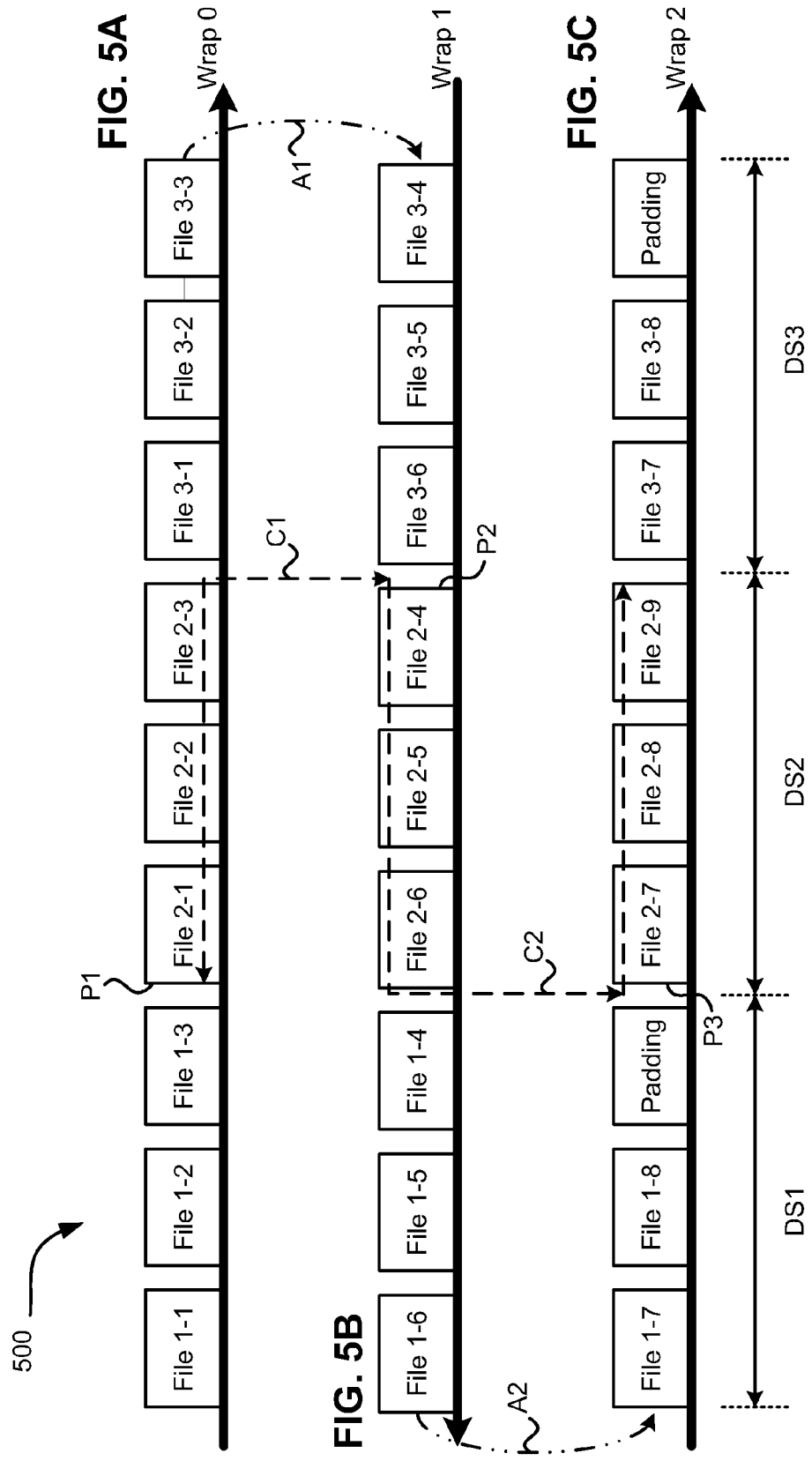
FIGS. 5A-C are schematic diagrams of a method for writing and reading data to and from a tape according to one embodiment.

Referring now to FIGS. 5A-5C, a method 500 for writing data on a tape according to one embodiment is illustrated. In this example, data from three data sources (DS1, DS2, DS3) are written in sequence to three wraps (Wrap 0, Wrap 1, Wrap 2) as files. In particular, FIGS. 5A-5C depict the writes to Wraps 0, 1 and 2, respectively. The data sources may include any devices that have any data transmission function, including but not limited to recorders such as cameras. Additionally, while FIGS. 5A-5B depict three data sources; any number of data sources may be included provided there are at least two data sources. Data (files) may include any information, e.g. stationary images, moving pictures, etc., sent at any time. Data from the data sources may be temporarily stored in a buffer (e.g. 12 in FIG. 4) and then written in wraps in sequence. Writing may be controlled by a controller (e.g. 16 in FIG. 4). The controller may invoke and execute a predetermined program from a built-in memory, for example, to control writing. Alternatively, a host (e.g. 30 in FIG. 4) may execute a predetermined program to remotely control the controller, thereby allowing the controller to control writing.

As shown in FIGS. 5A-5C, File 1-X denotes data from data source DS1; File 2-X denotes data from data source DS2, and File 3-X denotes data from data source DS3, while X may denote a file number, portion of a file or collection of files. In some approaches, data from each of data sources may be written in such a manner that the pieces of data are located in regions (locations) in wraps in the width (transverse) direction as a plurality of files. For instance, data from data source DS1 may be written in the first region in each wrap, while data from data sources DS2 and DS3 may be written in the second and third regions, respectively, as illustrated, by way of example only, in FIGS. 5A-5B. The data from the data sources may be written in any order, where such an order may correspond to user preferences, certain characteristics of the data sources, etc. For example, such an order may correspond to writing data from data sources with the fastest data transfer rates to the slowest. Alternatively, such an order may correspond to writing data from data sources comprising the largest amount of data to the smallest.

With reference to FIG. 5A, data from data source DS1 is written in Wrap 0 as Files 1-1, 1-2 and 1-3. Next, data from data source DS2 is written in Wrap 0 as Files 2-1, 2-2 and 2-3. Finally, data from data source DS3 is written in Wrap 0 as Files 3-1, 3-2 and 3-3. Upon completion of the write of File 3-3, the head (e.g. 14 in FIG. 4) moves to the next wrap, Wrap 1, as indicated by arrow A1 because a predetermined length of Wrap 0 has been reached (e.g. the end of the region in which data is to be written in Wrap 0 has been reached). It should be noted that number of data files sent from each data source and written to the tape are not limited to three as shown in FIG. 5A. In some approaches, the number of data files may be changed as needed, such as increasing the number of files when the amount of data increases or decreasing the number of files as the amount of data decreases, etc. Further, the number of data files that are sent from each data source and written to the tape may be the same, different, etc.

With reference now to FIG. 5B, data from data source DS3 is first written in Wrap 1 as Files 3-4, 3-5 and 3-6 while the tape moves in the direction opposite to the direction when writing in Wrap 0. Subsequently, data from data source DS2 is written in Wrap 1 as Files 2-4, 2-5 and 2-6. Next, data from data source DS1 is written in Wrap 1 as Files 1-4, 1-5 and 1-6. As show in FIG. 5B, the order of writing data from data sources in Wrap 1 (DS3, DS2, DS1) is reversed from the order corresponding to the writing in Wrap 0. This enables the data from the data sources to be located in regions (locations) in the width (transverse) direction of the tape in Wraps 0 and 1. Upon completion of the writing of File 1-6, the head (e.g. 14 in FIG. 4) moves to the next wrap, Wrap 2, as indicated by arrow A2 because the predetermined length of Wrap 1 has been reached (the end of the region in which data is to be written in Wrap 1 has been reached).

With reference now to FIG. 5C, data from data source DS1 is first written in Wrap 2 as Files 1-7 and 1-8 in the same order as the order in Wrap 0, while the tape moves in the same direction as the writing preformed in Wrap 0. Since no additional data from data source DS1 is stored in the buffer after File 1-8 in this example, predetermined dummy data (Padding) is written to, or near to, the beginning of the region where data is written from DS2. This may align the end positions of data from data source DS1 in Wraps 0 and 2, as shown in FIG. 5C.

With continued reference to FIG. 5C, data from data source DS2 is next written in Wrap 2 as Files 2-7, 2-8 and 2-9. Data from data source DS3 is then written in Wrap 2 as Files 3-7 and 3-8. Since no additional data from data source DS3 is stored in the buffer after File 3-8 in this example, predetermined dummy data (Padding) is written to, or near to, the end of the predetermined length of Wrap 2 (e.g. the end of the region in which data may be written in Wrap 2). This may align the end positions of data from data source DS3 in Wraps 0 to 2, as shown in FIG. 5C.

As also shown in FIG. 5C, data from the given data sources is written in Wrap 2 in the order of DS1, DS2 and DS3 as in Wrap 0, which is the reverse of the order of writing in Wrap 1. Sated another way, for both Wrap 0 and 2, data is written from the following data sources in the following order: DS1, DS2 and DS3. Conversely, for Wrap 1, data is written from the following data sources in the following order: DS3, DS2, DS1. The order for writing data from the data sources in Wrap 0 and 2 enables the data to be located in regions (locations) in the width (transverse) direction of the tape in Wraps 0 to 2. In some approaches, by relocating wraps, changing (reversing) the tape direction, and/or performing padding, data may be written in Wrap 3 and the subsequent wraps so that each piece of data from the data sources may be located in regions (locations) in the width (transverse) direction of the tape in Wraps 0 to N as a plurality of files.

The relationship between the length (predetermined length) of the wraps and the regions in which data from the data sources may be written, as illustrated in FIGS. 5A-5C, is described below with reference to steps (a)-(d). By way of example only, it is assumed that in the following description, a write buffer is provided in the LTFS and the capacity of the write buffer is X (GB). Additionally, is it assumed that data files from N data sources are written to one tape inserted in one tape drive. Again, for illustrative purposes, it is assumed that writing of data files from the data sources may start at the same time and the files from the data sources may be sent to the tape drive at the same transfer rate. Accordingly, relationships between the predetermined length of the wraps and the regions to which data from the data sources may be written may result from the following steps:

(a) The length (predetermined length) of wraps is reduced so that the capacity of the tape per wrap is $X*N/(N+1)$.
(b) The LTFS stores data in the write buffer until $X/(N+1)$ (GB) of data of each file have been sent.
(c) When $X/(N+1)$ (GB) of data of each file have been sent, the LTFS writes the $X/(N+1)$ (GB) of data of file 1 to N to the tape (wraps). If N=3, then the data files are written as illustrated in FIG. 5A.
(d) Steps (b) and (c) are repeated until the files have been written. If the size of a files is not a multiple of $X/(N+1)$, dummy data is written at the end of the files (padding) as illustrated in FIG. 5C to align the write positions of the files in the longitudinal direction in the wraps.

Note that the length (predetermined length) of wraps may be reduced so that the capacity per wrap described above is $X*N/(N-1)$ in some approaches. This may result because when writing in Wrap 0, the file from a data source to be written first may be written in Wrap 1 without waiting until $X/(N+1)$ (GB) of data have been sent from the data source. Consequently, the buffer, which has been emptied by writing data that has been allowed to be written because $X/(N+1)$ (GB) of data was sent into a wrap, may be reused for files sent from the data sources immediately after $X/(N+1)$ (GB) of data of each file was sent from the data sources. As a result, the data capacity equivalent to a total of two pieces of data may be saved, e.g. not needed, for two reasons: (1) because of not waiting until $X/(N+1)$ (GB) of data has been sent and (2) because a temporary storage area is not necessary for storing data sent from each data source immediately after $X/(N+1)$ (GB) of data has been sent.

As an example only, consider a situation where N is 2 (where there are data sources DS1 and DS2). In this example, if files sent from data source 1 are written in Wrap 0 without storing in the buffer having a capacity X, writing of files from data source 1 in Wrap 0 will end when the buffer having the capacity X is filled with files from data source 2. The capacity of Wrap 0 at that point in time is $X*2/(2-1)=X*2$. Once the buffer having the capacity X has been filled with the files from data source 2, files from data source 2 are written in Wrap 0. If files from the data sources are continuously stored in buffer space made available by writing the files from data source 2 in Wrap 0, files do not overflow the buffer, provided that the whole output from the buffer is greater than the whole input into the buffer. When the center of Wrap 1 is reached, the buffer will be filled with files from data source 1. Then, files from data source 1 will be written in the last half of Wrap 1 instead of writing files from data source 2 into the last half of Wrap 0 and the first half of Wrap 1. It is important to note that the same applies to cases where N is greater than or equal to 3.

In some approaches, the first step (a) mentioned above, corresponding to reducing the length (predetermined length) of the wraps, may be omitted by providing a sufficiently large write buffer. In other words, the amount of data equal to a specified capacity of the tape may be written without reducing the length of wraps of the tape. While no margin in the write buffer in the foregoing example, it may be preferable to provide a certain margin in practice.

In other approaches, by adjusting the order in which files are written or buffer allocations are made, writing start time may vary among data sources or different data sources may send data at different transfer rates. For example, a large buffer area may be allocated to a data source that starts writing earlier or the order in which files are written may be changed according to the transfer rate (for example, data sent at the highest transfer rate is written first). In some approaches the tape drive may have the function of compressing data to be written before writing the data to the tape; thus, the compression ratio of the data may be taken into account so that the data sizes of the compressed data are made equal.

According to various approaches, information such as the length (predetermined length) of wraps and the order in which files are written may be contained in a house keeping area of the tape, a format identification area of the tape, or the CM (24 in FIG. 2) of the tape cartridge as meta data available to the controller of the tape drive and LTFS servers.

A method for reading data written by the above described methods (e.g. method 500 described in FIGS. 5A-5C) may include steps (1)-(7) listed below, according to one embodiment. By way of example only, steps (1)-(7) involve reading file 2-X from DS2, as shown FIGS. 5A-5C. Such exemplary steps may include:

(1) Moving the head to position P1 at the beginning of File 2-1 in Wrap 0.
(2) Reading Files 2-1 to 2-3 from Wrap 0.
(3) Moving the head (e.g. along arrow C1) to the beginning (P2) of File 2-4 in Wrap 1.
(4) Reading Files 2-4 to 2-6 from Wrap 1.
(5) Moving the head (e.g. along arrow C2) to the beginning (P3) of File 2-7 in Wrap 2.
(6) Reading Files 2-7 to 2-9 from Wrap 2.

The method for reading data as outlined in steps (1)-(7) minimizes or avoids an extra move for locating data (files) after moving from one wrap to another when reading files written by the methods described herein. Accordingly, data (files) from the same data source that are written in adjacent wraps may be quickly and continuously read.

Comparison of reading data written from conventional methods versus reading data written from the methods described herein is illustrative. For instance, if data is written by a conventional method as shown in FIG. 1, about 10 complete files may need to be read in order to read one file. Thus, it may take 30 (GB)*10/140=2143 seconds to read one file if the maximum transfer rate of the tape medium is 140 MB/sec. Conversely, if data is written with the methods described herein (e.g. the method described with reference to FIGS. 5A-5C), it may take only 30 (GB)/140=214 seconds to read one file N because only the file N needs to be read. If wraps are not shortened, the time required for moving from one wrap to another may be negligible in terms of read time because there is no difference in the number of switches between wraps. If wraps are shortened and a slight misalignment between positions of files N in the longitudinal direction in wraps is taken into account, it is unlikely that a read time of 214 seconds will double to 428 seconds. Accordingly, is some approaches, the methods described herein may reduce the time required to read each of N files written in parallel to one another to less than 2/N.

Figure 6:
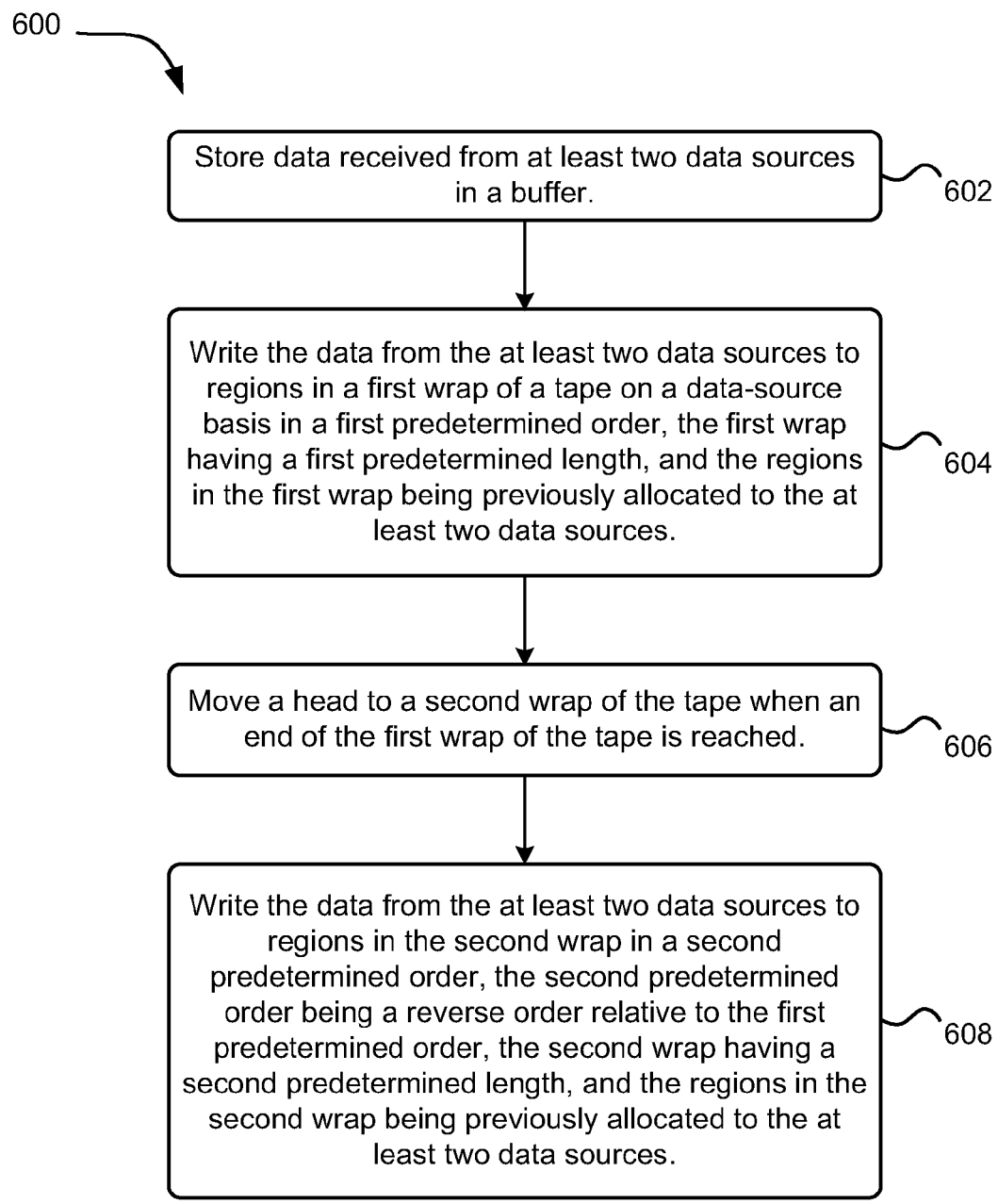
FIG. 6 is a flowchart of a method according to one embodiment.

Referring now to FIG. 6, a method 600 for writing data onto a tape is shown according to one illustrative embodiment. As an option, method 600 may be implemented in conjunction with features from other embodiments listed herein, such as those described with reference to the other figures. Further, this method and others presented herein may be used in various applications and/or permutations, which may or not be specifically described in the illustrative embodiments listed herein. Moreover, more or less steps than those described below may be included in the method according to various embodiments.

As shown in FIG. 6, the method 600 includes storing data received from at least two data sources a buffer. See operation 602. This data is written to regions in a first wrap of a tape on a data-source basis in a first predetermined order. See operation 604. The first wrap has a first predetermined length and the regions in the first wrap have been previously allocated to the at least two data sources. For example, data received from a first data source may have been previously allocated to a first region in the first wrap and data received from a second data source may have been previously allocated to a second region in the first wrap. In some approaches, the regions in the first and/or second wraps may be allocated to each of the at least two data sources according to an amount of data sent from each of the at least two data sources. In other approaches, the method may include the step of allocating the data received from the at least two data sources to regions in the first wrap of the tape.

In operation 606, the head is moved to a second wrap when an end of the first wrap of the tape has been reached. In some approaches, the method 600 may include the step of determining when the end of the first wrap of the tape has been reached.

In operation 608, the data from the at least two data sources is written to regions in the second wrap in a second predetermined order. The second predetermined order is a reverse order relative to the first predetermined order. For example, where there are two data sources, DS1 and DS2, the first predetermined order may correspond to data written in the first wrap from DS1 then DS2; whereas the second predetermined order may correspond to data written in the second wrap from DS2 then DS1. In addition, the second wrap has a second predetermined length and the regions in the second wrap have been previously allocated to the at least two data sources.

In one embodiment, the method 600 may also include determining whether an end to the second wrap has been reached. Upon determining that the end to the second wrap has been reached, the head may then be moved to a third wrap having a third predetermined length. Data from the at least two sources may then be written to regions in the third wrap a third predetermined order while the tape is moving in the same direction as when data was written in the first wrap. Further, the third predetermined order may be the same as the first predetermined order and the regions in the third wrap may have been previously allocated to the at least two data sources.

Also, in some approaches the first, second and third predetermined lengths may be the same or different. Alternatively, in other approaches the first and third predetermined lengths may be the same, while the second predetermined length is different from both the first and third predetermined lengths; the first and second predetermined lengths may the same, while the third predetermined length is different from the first and second predetermined lengths, etc. or any permutations thereof.

In another embodiment, the method 600 may include determining whether an amount of the data received from the at least two data sources is smaller than the amount of data capable of being written in the regions in the first, second and/or third wraps. Upon determining that the amount of data received from the at least two data sources is smaller than the amount of data capable of being written to the regions in the first, second, and/or third wraps, predetermined dummy data may be written following/after the written data from the at least two different data sources to an end of the regions of the respective wraps.

In yet another embodiment, the first predetermined order, the second predetermined order and/or the third predetermined order may be determined according a transfer rate of the data sent from the at least two data sources. As an example, a first predetermined order may correspond to writing data to the regions in the first wrap from data sources with the fastest data transfer rate to the slowest.

In a further embodiment, the first predetermined length, the second predetermined length and the third predetermined length of the first, second and third wraps, respectively, may be determined according to a storage capacity of the buffer. In other embodiments, the first, second and third predetermined lengths may be determined based on the following equation:

$$Vr=Vb*N/(N+1)$$

where Vr is a storage capacity of the respective wrap, Vb is a storage capacity of the buffer, and N is a number of the data sources. In additional embodiments, the first, second and third predetermined lengths may be the same or different.

Numerous embodiments of the present invention have been described with reference to the drawings. It will be clear that the various features of the foregoing systems and/or methodologies may be combined in any way, creating a plurality of combinations from the descriptions presented above. For instance, any of the features presented herein may be combined in any combination to create various embodiments, any of which fall within the scope of the present invention.

However, it should be understood, however, that the present invention is not limited to the above-described embodiments. For instance, the present invention may be used in various applications and/or permutations, which may or not be specifically described in the illustrative embodiments listed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for writing data onto a tape, comprising:
storing data received from at least two data sources in a buffer;
writing the data from the at least two data sources to regions in a first wrap of a tape on a data-source basis in a first predetermined order, the first wrap having a first predetermined length, and the regions in the first wrap being previously allocated to the at least two data sources;
moving a head to a second wrap of the tape when an end of the first wrap of the tape is reached; and
writing the data from the at least two data sources to regions in the second wrap in a second predetermined order, the second predetermined order being a reverse order relative to the first predetermined order, the second wrap having a second predetermined length, and the regions in the second wrap being previously allocated to the at least two data sources.

2. The method according to claim 1, further comprising:
writing predetermined dummy data following the written data from the at least two different data sources to an end of the regions of the first and/or second wraps when an amount of received data is smaller than an amount of data capable of being written in the regions in the first wrap and/or second wrap.

3. The method according to claim 1, wherein at least one of the first predetermined order and the second predetermined order is determined according to a transfer rate of the data sent from the at least two data sources.

4. The method according claim 1, wherein the regions in the first wrap and/or the regions in the second wrap are allocated to each of the at least two data sources according to an amount of data sent from each of the at least two data sources.

5. The method according to claim 1, wherein the first predetermined length of the first wrap and/or the second predetermined length of the second wrap is determined according to a storage capacity of the buffer.

6. The method according to claim 1, wherein the first predetermined length of the first wrap is determined by:

$$Vr = Vb \cdot N/(N+1)$$

where Vr is a storage capacity of the first wrap, Vb is a storage capacity of the buffer, and N is a number of the data sources.

7. The method according to claim 1, wherein the second predetermined length of the second wrap is determined by:

$$Vr = Vb \cdot N/(N+1)$$

where Vr is a storage capacity of the second wrap, Vb is a storage capacity of the buffer, and N is a number of the data sources.

8. The method according to claim 1, wherein the first predetermined length of the first wrap and the second predetermined length of the second wrap are the same.

9. The method according to claim 1, further comprising:
moving the head to a third wrap of the tape when an end to the second wrap has been reached; and
writing data from the at least two data sources to regions in the third wrap in a third predetermined order while the tape is moving in a same direction relative to the writing onto the first wrap, the third predetermined order being the same as the first predetermined order, the third wrap having a third predetermined length, and the regions in the third wrap being previously allocated to the at least two data sources.

10. A computer program product for writing data onto a tape, the computer program product comprising a computer readable storage medium having program code embodied therewith, the program code readable/executable by a controller to:
store data received from at least two data sources in a buffer;
write the data from the at least two data sources to regions in a first wrap of a tape on a data-source basis in a first predetermined order, the first wrap having a first predetermined length, and the regions in the first wrap being previously allocated to the at least two data sources;
move a head to a second wrap of the tape when an end of the first wrap of the tape is reached; and
write the data from the at least two data sources to regions in the second wrap in a second predetermined order, the second predetermined ordered being a reverse order relative to the first predetermined order, the second wrap having a second predetermined length, and the regions in the second wrap being previously allocated to the at least two data sources.

11. The computer program product of claim 10, further comprising program code readable/executable by the controller to:
move the head to a third wrap of the tape when an end to the second wrap has been reached; and
write data received from the at least two data sources to regions in the third wrap in a third predetermined order, the third predetermined order being the same as the first predetermined order, the third wrap having a third predetermined length, and the regions in the third wrap being previously allocated to the at least two data sources.

12. The computer program product of claim 10, further comprising program code readable/executable by the controller to:
write predetermined dummy data following the written data from the at least two different data sources to an end of the regions of the first and/or second wraps when an amount of received data is smaller than an amount of data capable of being written in the regions in the first wrap and/or second wrap.

13. A data storage system, comprising:
a controller;
a buffer adapted to store data received from at least two data sources;
a magnetic head electrically coupled to the controller;
a drive mechanism for passing a magnetic medium over the magnetic head;
wherein the controller is configured to:
store data received from at least two data sources in a buffer;
write the data from the at least two data sources to regions in a first wrap of a tape on a data-source basis in a first predetermined order, the first wrap having a first predetermined length, and the regions in the first wrap being previously allocated to the at least two data sources;
move the head to a second wrap of the tape when an end of the first wrap of the tape is reached; and
write the data from the at least two data sources to regions in the second wrap in a second predetermined order, the second predetermined ordered being a reverse order relative to the first predetermined order, the second wrap having a second predetermined length, and the regions in the second wrap being previously allocated to the at least two data sources.

14. The data storage system according to claim 13, wherein at least one of the first predetermined order and the second predetermined order is determined according to a transfer rate of the data sent from the at least two data sources.

15. The data storage system according to claim 13, wherein the regions in the first wrap and/or the regions in the second wrap are allocated to each of the at least two data sources according to an amount of data sent from each of the at least two data sources.

16. The data storage system according to claim 13, wherein the first predetermined length of the first wrap and/or the second predetermined length of the second wrap is determined according to a storage capacity of the buffer.

17. The data storage system according to claim 13, wherein the first predetermined length of the first wrap is determined by:

$$Vr = Vb \cdot N/(N+1)$$

where Vr is a storage capacity of the first wrap, Vb is a storage capacity of the buffer, and N is a number of the data sources.

18. The data storage system according to claim 13, wherein the second predetermined length of the second wrap is determined by:

$$Vr = Vb \cdot N/(N+1)$$

where Vr is a storage capacity of the second wrap, Vb is a storage capacity of the buffer, and N is a number of the data sources.

19. The data storage system according to claim 13, wherein the controller is further configure to write predetermined dummy data following the written data from the at least two different data sources to an end of the regions of the first and/or second wraps when an amount of received data is smaller than an amount of data capable of being written in the regions in the first wrap and/or second wrap.

20. The data storage system according to claim 13, wherein the controller is further configure to:
move the head to a third wrap of the tape when an end to the second wrap has been reached; and
write data from the at least two data sources to regions in the third wrap in a third predetermined order while the tape is moving in a same direction relative to the writing onto the first wrap, the third predetermined order being the same as the first predetermined order, the third wrap having a third predetermined length, and the regions in the third wrap being previously allocated to the at least two data sources.

\* \* \* \* \*